Oct. 2, 1962 W. A. THOMAS 3,056,379
AUTOMATIC FILTER SIGNAL ASSEMBLIES
Filed Aug. 15, 1960 5 Sheets-Sheet 3

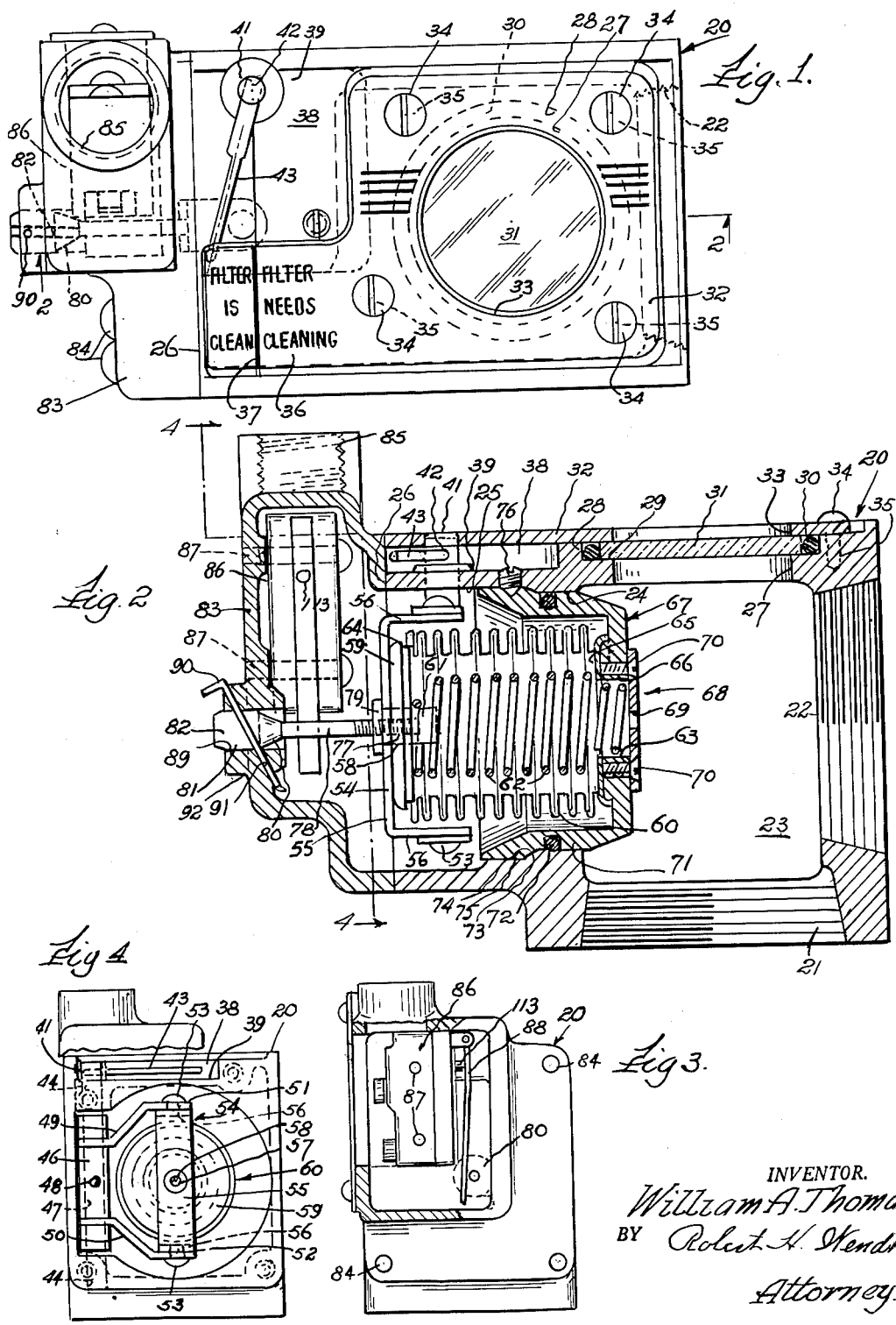

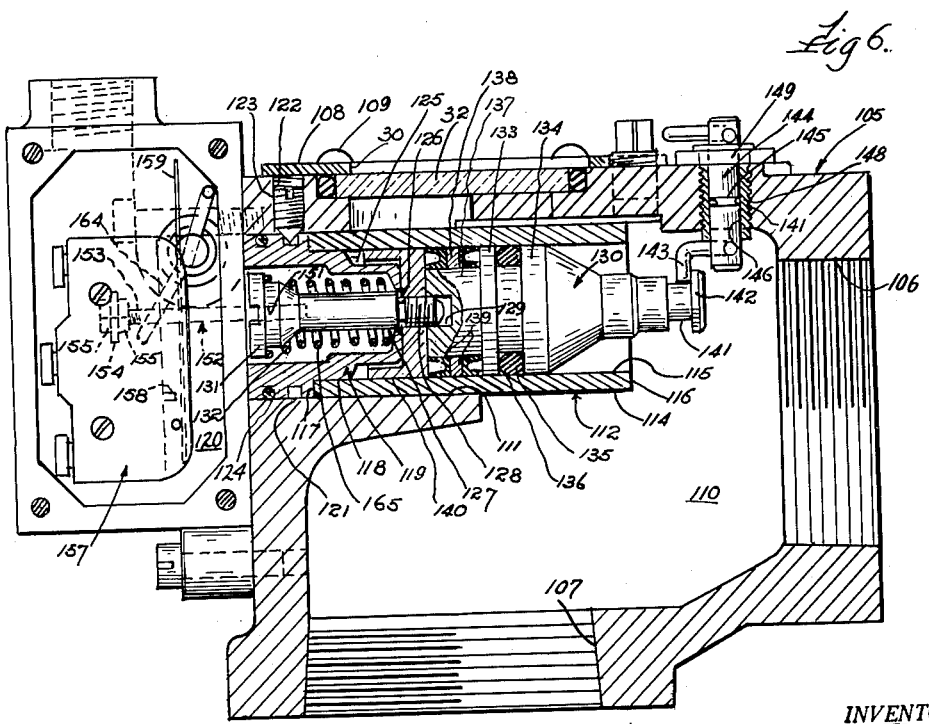

INVENTOR.
William A Thomas
BY Robert H. Wendt
Attorney

Oct. 2, 1962 W. A. THOMAS 3,056,379
AUTOMATIC FILTER SIGNAL ASSEMBLIES
Filed Aug. 15, 1960 5 Sheets-Sheet 4
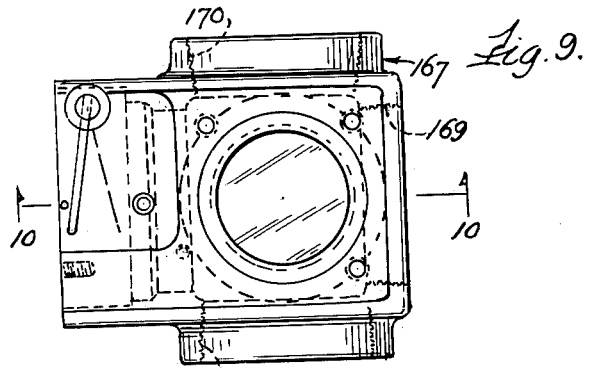
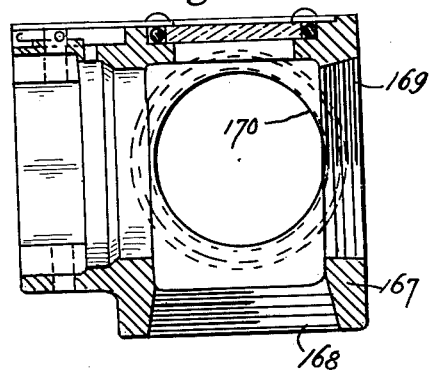
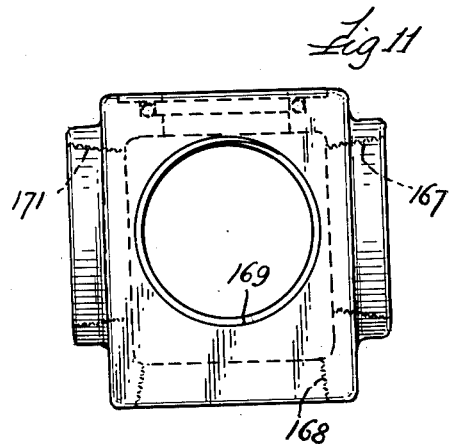
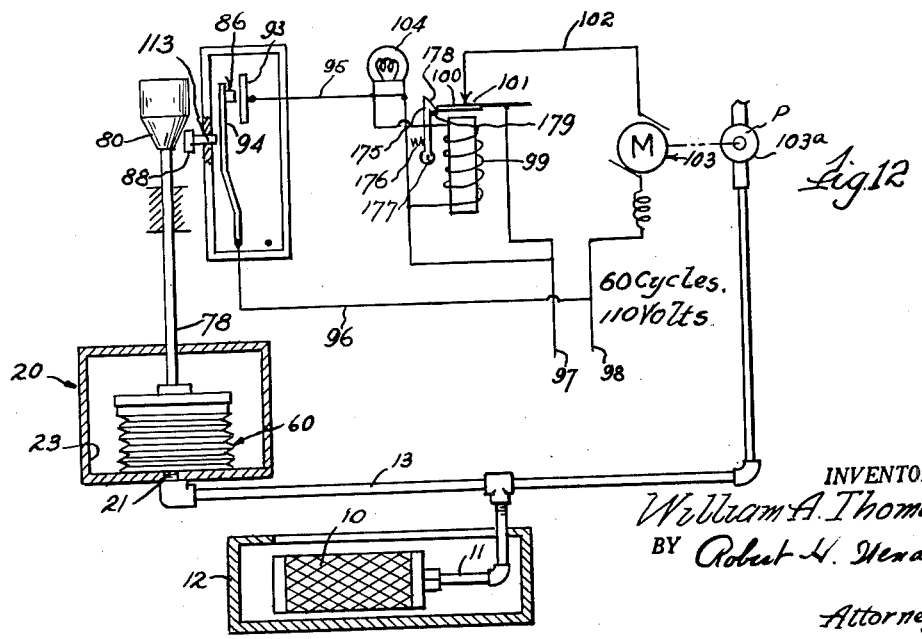
INVENTOR.
William A. Thomas,
BY Robert H. Wendt
Attorney

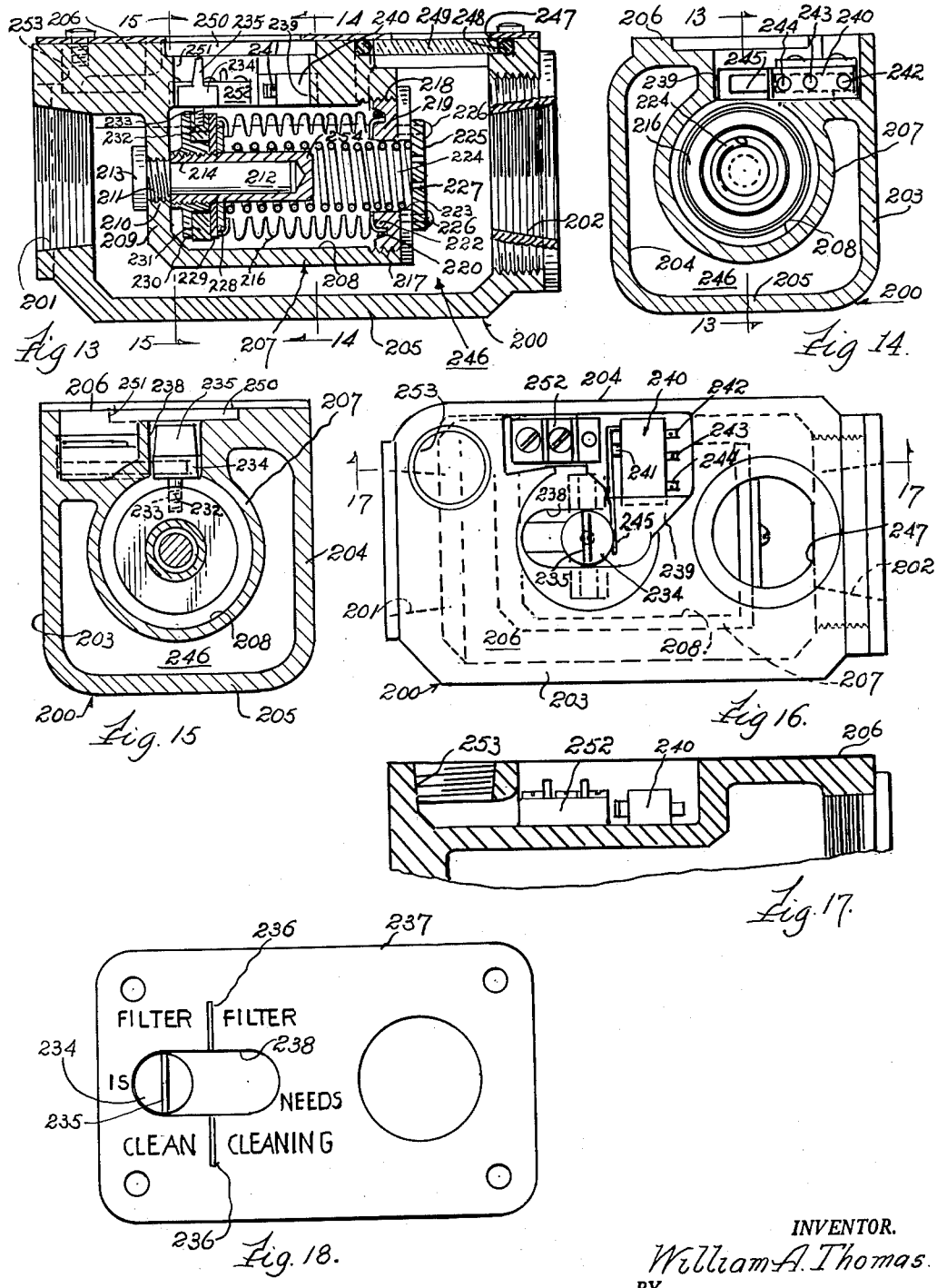

_United States Patent Office_ 3,056,379
Patented Oct. 2, 1962

3,056,379
AUTOMATIC FILTER SIGNAL ASSEMBLIES
William A. Thomas, Chicago, Ill., assignor to Marvel Engineering Company, Chicago, Ill., a corporation of Illinois
Filed Aug. 15, 1960, Ser. No. 49,629
2 Claims. (Cl. 116—70)

The present invention relates to automatic filter signal assemblies, and is particularly concerned with automatic signal devices which are adapted to be inserted in any pumping line which has a filter, as distinguished from the type of filter signals in which the filter itself is adapted to move to actuate a signal when the filter becomes clogged.

One of the objects of the invention is the provision of an improved filter signal unit which is adapted to indicate changes in suction pressure in the filter line so that the present units may be employed with filters of the type that are installed in a sump for indicating the condition of the filter, whether it is clean or dirty or clogged, and for controlling the electric circuit of a pump which pumps the oil passing through the filter.

Another object of the invention is the provision of improved automatic filter signal systems in which the signal devices do not have to be provided with oil seals at the point where they emerge from the housing of the unit.

Another object of the invention is the provision of a plurality of different types of automatic filter signal assemblies adapted to meet different conditions and adaptable for assembly with various types of filters.

Another object of the invention is the provision of automatic filter signal units which are simple in construction, which have a minimum number of parts, which may be manufactured economically, and which are dependable and positive in their action.

Another object of the invention is the provision of an improved system in which the pump remains on cut off condition whenever it has been shut off responsive to the clogging of the filter, while still giving a signal that the filter should be changed, and in which manual attention is required to restart the pump after the new filter has been supplied.

Another object of the invention is the provision of an improved indicating unit including a minimum number of parts, and which may be reduced to a very small size by attaching a pointer directly to one end of the bellows, which is actuated responsive to the clogging of the filter.

Other objects and advantages of the invention will be apparent from the following description and the accompanying drawings, in which similar characters of reference indicate similar parts throughout the several views.

Referring to the drawings,

FIG. 1 is a top plan view of one of the filter signal units;

FIG. 2 is a sectional view, taken on the plane of the line 2—2 of FIG. 1, looking in the direction of the arrows;

FIG. 3 is an end elevational view on a reduced scale, partially broken away to show the interior structure, taken from the left end of FIG. 2;

FIG. 4 is a sectional view, on a reduced scale taken on the plane of the line 4—4 of FIG. 2, looking in the direction of the arrows;

FIG. 5 is a top plan view of a modification;

FIG. 6 is a sectional view taken on the plane of the line 6—6 of FIG. 5, looking in the direction of the arrows;

FIG. 9 is a top plan view of a modification of FIG. 1, showing a modified housing of a universal type;

FIG. 10 is a sectional view taken on the plane of the line 10—10 of FIG. 9, looking in the direction of the arrows;

FIG. 11 is an elevational view taken from the right end of FIG. 9;

FIG. 12 is a diagrammatic view of the system and wiring diagram.

FIG. 13 is an axial sectional view taken on the plane of the line 13—13 of FIG. 14, looking in the direction of the arrows;

FIG. 14 is a sectional view of the same modification taken on the plane of the line 14—14 of FIG. 13, looking in the direction of the arrows;

FIG. 15 is a sectional view taken on the plane of the line 15—15 of FIG. 13, looking in the direction of the arrows;

FIG. 16 is a top plan view of the assembly with the cover plate and windows removed;

FIG. 17 is a fragmentary sectional view taken on the plane of the line 17—17 of FIG. 16, looking in the direction of the arrows;

FIG. 18 is a top plan view of the cover plate.

Figure 7:
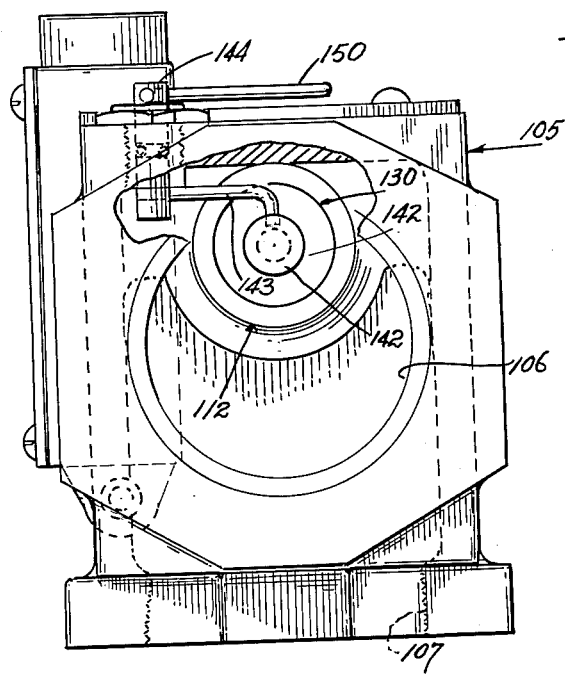
FIG. 7 is an end elevational view taken from the right end of FIG. 5, partially broken away to show the interior structure.

Referring to FIGS. 1–4, this indicating unit preferably comprises a cast metal housing 20, which may take the form of an elbow, since it is provided with a threaded inlet 21 for a pipe leading to a filter unit in a sump and a threaded outlet 22 for receiving a pipe extending to the oil pump.

The housing 20 may be substantially rectangular and may have a rectangular chamber 23 communicating with the inlet 21 and outlet 22 and with a cylindrical bore 24 and a larger counterbore 25 extending out of the end 26 of the housing.

The top of the housing is preferably provided with a circular window opening 27 communicating with a larger counterbore 28, thus providing an annular shoulder 29 against which an O-ring 30 of rubber is seated, bearing against the edge of a circular window 31, which may be of glass or plastic, and which is confined in the bore 28 by the top plate 32.

The top plate 32 also has a circular opening 33, exposing the window 31, which gives an indication of the operation of the system, since oil will be visible through the window 31 when the system is operating properly. The top plate 32 has four apertures for receiving the shanks of screw bolts 34, the heads of which secure the top plate, and the shanks of which are threaded into threaded bores 35 in the body of housing 20.

The top plate 32 may be rectangular, but has a laterally extending rectangular portion 36, which has an indicating line 37 with indicia on the left, such as "Filter Is Clean" and indicia on the right, such as "Filter Needs Cleaning." The line 37 indicates the critical pressure above which the filter should be cleaned.

The housing 20 is provided on its upper face with a rectangular depression 38, the lower wall 39 of which is provided with a through bore 40 for rotatably supporting a shaft 41. The shaft 41 comprises a cylindrical shaft having a transverse bore 42 in its upper end, receiving the threaded end of a cylindrical pointer 43, the end of which extends to the indicia and line 37 under the top plate 32.

The shaft 41 is rotatably mounted in a pair of aligned bores 44, 45 (FIG. 4) and preferably supports a hub 46, which has a through bore 47 passing the shaft, which is secured to the hub by a through screw bolt threaded into the hub.

The hub 46 carries a pair of radially extending arms 49, 50, which are bent outward diagonally and provided with bearing portions 51, 52 for pivotally receiving the rivets 53, which are pivotally mounted in the ends of a U-shaped member 54. The U-shaped member 54 comprises a flat body 55 and a pair of laterally extending arms 56; and the flat body 55 may be provided with a through bore 57, which is adapted to receive a cylindrical threaded member 58 threaded into the end plate 59 of a resilient metal bellows 60 and having a cylindrical inner extension 61 serving as a seat for a spring 62.

In some embodiments of the invention the unit may be biased only by the resilient bellows, which requires a certain amount of pressure to collapse the bellows; but in other embodiments the bellows may be provided with a helical spring 62 seated at one end on the lug 61 and at the other end in a cylindrical bore 63.

The bellows may be sealed with solder or epoxy at its connection 64 to the end plate 59; and at its other end it is provided with an end plate 65 sealed to the bellows and having a cylindrical flange 66 extending into a supporting body 67. An end plate closes the end of the bellows, but has an aperture 69 for passing oil; and the end plate is secured to the body 67 by a plurality of screw bolts 70.

Body 67 comprises a cylindrical metal member, the cylindrical wall 71 of which fits in the bore 24; and the wall 71 is provided with a groove for a rubber O-ring 72, establishing an oil-tight seal. The body 67 may have a frusto-conical shoulder 73 seating against a similar shoulder 74; and it may have a cylindrical enlargement 75 fitting in the counterbore 25.

A set screw 76 threaded into the body 20 extends into a groove in the supporting body 67 and fixedly secures the body 67 and the right end of the bellows in the housing 20.

The threaded member 58 has a threaded bore 77 receiving the threaded end of a connecting rod 78; and a nut 79 may lock the U-shaped member 54 on the end of the bellows. Connecting rod 78 extends axially from the bellows and is provided with a frusto-conical portion 80 on a cylindrical enlargement 81, which is provided with a diametrical slot 82.

The end 26 of the housing supports an auxiliary switch housing 83, the open end of which fits against the end 26 of housing 20, where it is secured by a plurality of screw bolts 84 passing through housing 83 and threaded into housing 20.

Housing 83 has a threaded bore 85 for conduit containing electric conductors which lead to a microswitch unit 86 secured in the housing by screw bolts 87.

The switch unit 86 is preferably a unit of the snap type which is normally closed, but may be moved to open position by pressure on a button 113, which is adapted to be engaged by a pivoted metal arm 88 extending into the vicinity of the conical portion 80 on the connecting rod 78.

Switch arm 88 is normally out of contact with the connecting rod 78 to reduce friction; but when the bellows end 59 moves inward toward the right, the frusto-conical portion 80 of the connecting rod 78 cams switch arm 88 to the left in FIG. 3, actuating the button 113, which is biased outward and closing the switch for the purpose of providing an electric signal or controlling a pump, as illustrated in the circuit of FIG. 12.

The cylindrical end 81 of the connecting rod 78 is guided in a cylindrical bore 89 in the housing 83, from which it projects; and the slot 82 may receive a screwdriver to adjust the effective length of the connecting rod in the threaded bore 77 and to adjust the point at which the switch will be actuated, diagonally extending pin 90 extends into an aperture 91 in the hub 92 of housing 83, but permits the sliding of head 81 with its slot 82 on the pin 90, which maintains the adjustment of the connecting rod 78 by preventing its rotation.

The operation of the indicating unit is as follows:

When the housing is connected to a filter 10 in a sump 12 and to a pump pumping oil and producing a reduced pressure in the housing chamber 23, this reduced pressure is not sufficient to actuate the bellows until the filter becomes clogged, when the suction draws the bellows inward, indicating that the filter is dirty, by means of the pointer 43, and actuating the switch 86 to produce an electrical indication.

The unit is thus adapted to indicate when the filter is clean and when it needs cleaning; and the present unit may be inserted in any oil line where a reduction in pressure is caused by the clogging of a filter.

Referring to FIG. 12, this is a wiring diagram in which the bellows 60 is indicated diagrammatically and provide the connecting rod 78 actuating the conical camming surface 80.

Camming surface 80 actuates switch lever 88, which actuates button 113, closing switch 86. Switch contacts 93, 94 are connected by conductors 95 and 96 to the electric supply lines 97, 98 and to the coils 99 of a relay, the armature 100 of which breaks the circuit at contact 101.

The relay 99 has its armature 100 located adjacent a latching pawl 175 pressed by a spring 176 and pivoted at 177 so arranged that its beveled end 178 is cammed backward by the armature 100 until the armature is retained under the shoulder 179 with the contact 101 in the open position.

Thus, whenever the motor has been shut off by the clogging of the filter, it is held in this position by the latch 175 until it is manually released. Otherwise the motor might be turned on and off again as the pressure varies in the system.

Contact 101 and armature 100 are connected in the line 97 and a line 102, which extends to the pump motor 103, the other terminal of which is connected to line 98. Thus, whenever the switch closes, relay 99 is energized, opening the circuit of the pump motor, stopping the pump when the filter becomes clogged to a predetermined degree.

A signal is also given when the switch closes by the lighting of an electric lamp 104, indicating that the filter is clogged and that the motor has been stopped.

It should be understood that the feature of the signal lamp 104 and the relay 99 controlling the motor may both be used or either one may be used.

Figure 8:
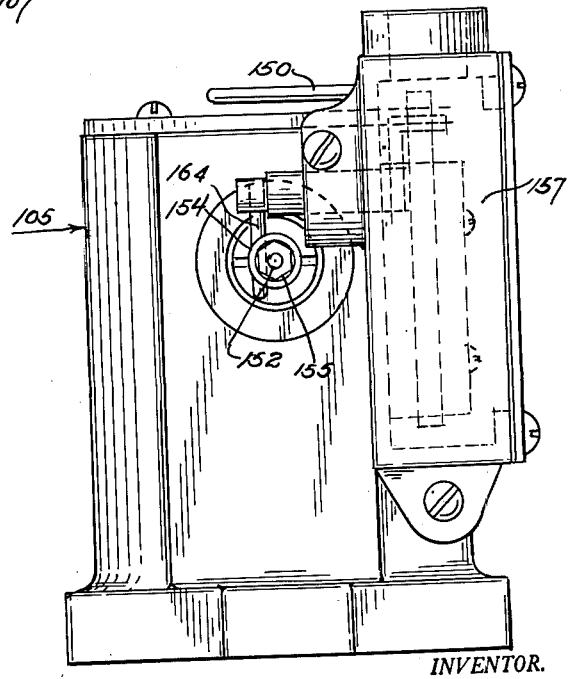
FIG. 8 is an end elevational view taken from the left end of FIG. 6.

Referring to FIGS. 5, 6, and 8 these are views of another modification, in which the bellows is replaced by a moving piston actuated by the suction. This modification may have a similar housing 105 with an outlet 106 and inlet 107.

The housing may have a similar window 31 mounted in the same way by means of a metal ring 108 secured by screw bolts 109 against the O-ring 30. The housing 105 has a pressure chamber 110, which is provided with a cylindrical bore 111 for receiving a cylinder 112.

The cylinder 112 may comprise a machined brass member having an outer cylindrical surface 114 and an inner honed cylindrical surface 115 and plane ends 116, 117. The left end of the cylinder 112 has a tight frictional fit about a cylindrical surface 118 of a steel body 119, which is made separately so that the cylinder 112 may be accurately finished on the inside.

Body 119 has an outer cylindrical surface, which is flush with the outer cylindrical surface 114 of the cylinder; and the assembly of cylinder 112 and body 119 have a sliding fit in the bore 111 of housing 105.

Body 119 has an annular groove 121, which is adapted to receive the end of a set screw 122 located in a threaded bore 123 in the upper wall of body 105, thus securing the cylinder assembly in the housing. The open end of body 105 is sealed by a rubber O-ring 124 located in a groove in body 119.

Body 119 has a reduced cylindrical portion 125 projecting into the cylinder 112; and the right end of body 119 has a bore 126 for passing a spring supporting bolt 127, which has its threaded end 128 threaded into a bore 129 in the left end of piston 130. Bolt 127 has an enlarged head 131 acting as a seat for a helical spring 132, which is also seated against the end wall of body 119, urging the bolt 127 and the piston 130 toward the left.

Piston 130 comprises a generally cylindrical metal body having a pair of cylindrical portions at 133, 134 separated by groove 136 for an O-ring, 135, and piston 130 has a reduced cylindrical portion 137 supporting a loose ring 138 between a pair of oppositely directed U-seals 139.

The bolt 127 passes through a cup shaped cylindrical member 140 and secures it to the cylinder; and the cup overlaps the end of the reduced portion 125 and provides additional guide surface for the piston 130.

Various types of seals may be employed; but it is important that the piston slide freely under the reduced pressures which may be encountered; and the spring pressure on the piston may be adjusted by the use of a stronger or a weaker spring.

At its inner end the piston 130 has a reduced portion 141 and a flange 142 providing an annular groove for receiving the end of a crank pin 143, which extends radially from the shaft 144 and downwardly into engagement with the flange 142. Shaft 144 is provided with a groove 145 for receiving a rubber O-ring, forming a seal in the bore 146 of a threaded bushing 147.

The bushing is threaded into a threaded bore 148 in the housing 105 and has a non-circular head 149. At its upper end shaft 144 has a threaded bore receiving the threaded end of a cylindrical pin 150, forming a pointer.

The pointer moves over indicia, such as a central line indicating the point at which the filter should be cleaned, and the letter C at the left indicating a clean filter, with a letter F at the right indicating a full or clogged filter. Various types of indicia may be employed.

The head 131 of the bolt 127 carried by the piston is provided with a threaded bore 151 for receiving the end of a threaded connecting rod 152, which has another threaded end 153 provided with a washer 154 between lock nuts 155.

An auxiliary switch housing 156 is bolted to the end of the cylinder housing 105 and is provided on its inside with a switch 157 having a switch button 158 actuated by a switch arm 159, which in turn is actuated by a crank pin 160 carried by the lower end of shaft 161. Shaft 161 is rotatably mounted in a bore 162 and is provided with an O-ring of rubber mounted in a groove to seal the shaft, if necessary.

The upper end of the shaft 161 carries a crank pin 164, which projects into the path of the washer and nut assembly 154, 155.

The switch 157 is of the snap type with its button biased to the open position; and when the piston 130 moves toward the right, the switch is actuated at the time when the filter becomes clogged; and it may energize a relay, cutting off an electric pump motor or cutting off the ignition of an engine driving a pump, and energizing a signal light, or both, according to the circuit of FIG 12.

The operation of the modification shown in FIGS. 5–8 is as follows:

The housing 105 in the form on an elbow is connected at inlet 107 to a pipe leading to a filter located in a sump. The pump is connected to the outlet 106; and the chamber 107 is subject to the reduced pressure by suction of the pump.

When the filter becomes clogged, the pressure is further reduced in the chamber 110 relative to the external air pressure; and the piston 130 moves toward the right against the spring 165; and the position of the piston depends upon the reduced pressure, which is sufficient to move the piston to the piston indicated by the line 166 when the filter is clogged.

Referring to FIGS. 13–18, this is an improved modification, the size of which has been greatly reduced by simplification of its parts.

In this device 200 indicates the unit housing, comprising a cast metal member of substantially rectangular shape, having a threaded opening 201 at its left end (FIG. 13) and a second threaded opening 202 at the opposite end. The opening 201 may be connected to the suction pipe which leads to the filter in the sump. The opening 202 may be connected to the pipe leading to the pump.

The housing 200 ma yhave side walls 203, 204, bottom wall 205, and a top wall 206. Integrally secured to the top wall 206 there is a cylindrical housing 207 having an inner cylindrical bore 208. The housing 207 is closed at its left end by an end wall 209 having a threaded bore 210 for receiving the threaded portion 211 of a guide post 212, also having a head 213 which may close the bore 210 with a gasket.

The guide post 212 is cylindrical in shape for slidably engaging in a cylindrical bore in the end closure member of a bellows 216.

The bore 208 is threaded at 217 for receiving the threaded portion 218 of the end wall 219 of the bellows 216. End wall 219 has an annular shoulder 220 on which a cylindrical flange 221 of the bellows is soldered or sealed with epoxy resin. The end wall 219 has a radial flange 222 engaging the end of the housing 207 and provided with a suitable gasket; and the end wall 218 may have a central bore 223 for receiving the end of a coil spring 224.

The coil spring is seated against a plate 225, which is secured by screw bolts 226 on the end wall 219. Small apertures 227 permit the oil to enter the bellows and to subject the bellows to suction from the pump; but the small apertures tend to dampen the movement of the bellows and to give a steady indication.

The closure member 215 for the movable end of the bellows comprises a body having a cylindrical portion 228 upon which a cylindrical flange of the bellows is soldered. The body has a pair of radial flanges 229 and 230 between which a cylindrical washer 231 is mounted for rotation; and the washer 231 has a threaded bore 232 for receiving the shank 233 of a cylindrical button 234.

The cylindrical button 234 has a transverse rib 235 at its outer end, this rib serving as a pointer to come into registry with a pair of aligned ribs or lines 236 on the cover plate 237 (FIG. 18).

The housing 200 has an oval opening 238, within which the cylindrical button 234 slides; and the cover plate 237 may have a registering oval opening. The housing also has another opening communicating with the bore 208, and indicated at 239, for housing a switch unit 240.

The switch unit 240 is preferably of the snap push button type, the button being indicated at 241 and three terminals at 242, 243, 244.

A spring arm 245 is carried by the switch unit 240, extending over the button 241 and urged to the left by button 241, which is spring pressed outward.

The cylindrical button 234 mounted on the movable end of a bellows strikes the switch arm 245 and actuates the switch when the rib 235 comes into registry with the lines 236, which is the point at which the filter is sufficiently clogged to reduce the pressure in the chamber 246 to actuate the bellows.

The housing 200 has a cylindrical recess 247 for receiving an O-ring 248 and a window member 249, exposing the interior of the chamber 246.

Another similar window 250 is located in a recess 251 and sealed with an O-ring 252; and both windows and the O-rings are secured in sealing position by the cover plate 237.

252 indicates a connector block and 253 a threaded port for electrical conduit.

By having three terminals on the switch unit 240 the user may select two for closed circuit or two others for open circuit operations. The operation of this modification is substantially the same as those previously described except that the pivoted pointers have been eliminated and the pointer is directly mounted on the movable end of the bellows.

The guide post 212 slides in the inwardly projecting cylindrical lug 254 upon which the spring is seated, and assures the translation of the end wall 215 without tilting.

The interior of the bellows is subject to suction and reduced pressure in the chamber 246, which results from the clogging of the filter and causes the end wall 215 of the bellows to move toward the right.

When the pointer member 234 is at the left position in FIG. 18, the filter is indicated as being clean; and when it reaches the central position, or the right hand position in FIG. 18, the filter needs cleaning.

It will thus be observed that the present modification is more simple and requires a lesser number of parts, and may be reduced in size over those previously described.

Referring to FIGS. 9, 10, and 11, these are modifications of the housing of a type which may be called universal. Housing 167 is not only provided with the elbow inlet 168 and the pump outlet 169 (FIG. 10), but it may be provided with oppositely located threaded bores 170 and 171 so that it may take the form of a T-fitting, as well as an elbow.

It should also be understood that either threaded or flanged fittings may be employed; and it is only necessary to have one connection to the suction pipe to subject the chamber 110 or 23 to the suction pressure which is the result of the action of the pump and the possible clogging of the filter.

It will thus be observed that I have invented a plurality of different forms of the filter signal units, which may be located at points remote from the filter for indicating the condition of the filter relative to clogging and for controlling the operation of a pump and giving a signal at a remote point.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An oil filter indicator for indicating the dirty condition of the filter, comprising a metal housing having a threaded inlet to be connected to a filter suction line, said housing having an inner wall provided with a circular bore for passing oil from said suction line into the interior of a metal bellows, a metal bellows having a corrugated extensible side wall and having an open end secured to said inner wall about the open end of said bellows to place the interior of said bellows in communication with the oil from said suction line, said bellows having its end closed opposite to the open end of said bellows, a guide post carried by the closed end of said bellows and adapted to be moved inward by the bellows when the bellows is subjected to inner suction, and a guide carried by the housing and having a cylindrical bore for slidably guiding said guide post, a metal indicator pointer adapted to be moved from an indicating position where the filter is clean to a second position when the filter is dirty, connecting mechanism between said pointer and the closed end of said bellows for moving the pointer responsive to movement of the bellows under suction acting on its interior, a transparent window carried by the housing and exposing said pointer in both of its positions, said bellows being subjected to suction on its inside from the filter suction line and the suction in said housing increasing as the filter clogs with dirt until the bellows moves its closed end inward until the closed end of the bellows has moved the pointer to the indicating position wherein the filter is clogged.

2. An oil filter indicator for indicating the dirty condition of an oil filter according to claim 1, including an electric switch carried by the housing and an actuating member carried by said guide post for actuating said electric switch, a relay in circuit with said switch and arranged to break the circuit through a driving motor and to close the circuit through a signal light, preventing further operation of the motor and indicating the clogged condition of the filter.

References Cited in the file of this patent

UNITED STATES PATENTS

| | | |
|---|---|---|
| 997,987 | Frey | July 18, 1911 |
| 2,033,417 | Dezotell | Mar. 10, 1936 |
| 2,499,494 | Greer | Mar. 7, 1950 |
| 2,936,731 | Rosaen | May 17, 1960 |